United States Patent
Uh et al.

(10) Patent No.: US 7,912,518 B2
(45) Date of Patent: Mar. 22, 2011

(54) POWER SAVING METHOD FOR MOBILE TERMINAL

(75) Inventors: Rae-Jin Uh, Seoul (KR); Sung-Guk Na, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 782 days.

(21) Appl. No.: 11/865,518

(22) Filed: Oct. 1, 2007

(65) Prior Publication Data

US 2008/0090623 A1 Apr. 17, 2008

(30) Foreign Application Priority Data

Oct. 12, 2006 (KR) .................. 10-2006-0099353

(51) Int. Cl.
*H04M 1/00* (2006.01)
*H04B 1/38* (2006.01)

(52) U.S. Cl. .................. 455/574; 455/343.2; 455/343.5; 370/305; 370/311

(58) Field of Classification Search ............... 455/426.1, 455/456.1, 445, 458, 432.1, 574, 414.1, 343.2, 455/127.1, 343.5; 370/331, 328, 338, 329, 370/352, 410, 401, 311, 342, 305
See application file for complete search history.

(56) References Cited

U.S. PATENT DOCUMENTS

| | | | | |
|---|---|---|---|---|
| 6,112,269 | A | * | 8/2000 | Nordling ........................ 710/69 |
| 7,305,259 | B1 | * | 12/2007 | Malone et al. ................ 455/574 |
| 7,640,008 | B2 | * | 12/2009 | Gallagher et al. ......... 455/414.1 |
| 2002/0095530 | A1 | * | 7/2002 | Wong ................... 710/1 |
| 2002/0106997 | A1 | * | 8/2002 | Barber et al. ................ 455/343 |
| 2003/0032462 | A1 | * | 2/2003 | Wang et al. .................. 455/574 |
| 2005/0080935 | A1 | * | 4/2005 | Fukae et al. ..................... 710/1 |
| 2005/0143146 | A1 | * | 6/2005 | Kim .............................. 455/574 |
| 2007/0140199 | A1 | * | 6/2007 | Zhao et al. .................... 370/338 |
| 2008/0220796 | A1 | * | 9/2008 | Kohlmann et al. ........... 455/458 |
| 2010/0061431 | A1 | * | 3/2010 | Jyrkka et al. ................. 375/220 |

FOREIGN PATENT DOCUMENTS

| | | |
|---|---|---|
| CN | 1401159 | 3/2003 |
| KR | 1020020006157 | 1/2002 |
| WO | WO 01/61873 | 8/2001 |

* cited by examiner

*Primary Examiner* — Sujatha Sharma
(74) *Attorney, Agent, or Firm* — The Farrell Law Firm, P.C.

(57) ABSTRACT

Provided is a power saving method for a mobile terminal, of a WiBro communication system, particularly for a standby mode. A power saving method for a mobile terminal having a modem for communicating with a base station and a host for controlling the modem, includes starting, at the mobile terminal, a timer if a resource withdrawal is determined through a negotiation with the base station; turning off power to the modem; determining whether the timer has expired; and turning on the power to the modem.

12 Claims, 4 Drawing Sheets

POWER SAVING METHOD FOR MOBILE TERMINAL

PRIORITY

This application claims priority under 35 U.S.C. §119 to an application entitled "Power Saving Method For Mobile Terminal" filed in the Korean Intellectual Property Office on Oct. 12, 2006 and assigned Serial No. 2006-0099353, the contents of which are incorporated herein by reference.

BACKGROUND OF THE INVENTION

1. Field of the Invention

The present invention relates to a Wireless Broadband (WiBro) mobile communication system and, in particular, to a power saving method for a mobile terminal of the WiBro communication system.

2. Description of the Related Art

The technological advancements and rising usage of mobile communication have dramatically influenced people's everyday life. As a result of these technological advancements, mobile communication devices are becoming ever more popular and widely accepted for data communications as well as for conventional voice communications, and user requirements for various convenient services and high speed data transmission increase.

Wireless Broadband (WiBro) is a wireless broadband Internet technology developed for satisfying user's demands for wireless voice and data communication while on the move. WiBro provides the user with voice and data connectivity anytime and anywhere even on the move.

WiBro operates in the 2.3 GHz bandwidth and covers about 1 Km range. WiBro supports high-speed data service in an indoor and outdoor stationary and pedestrian-speed and mobile environment of below 60 Km/h. WiBro also provides high speed and reliable Internet service at a low cost relative to other communication networks.

A mobile terminal provides for transition between different modes (i.e., active, sleep, and idle modes). In the active mode, the mobile terminal transmits and receives packets to and from a base station. The sleep mode is intended to minimize power consumption of the mobile terminal by pre-negotiated periods of absence from the base station air interface. The idle mode allows the mobile terminal to become periodically available for downlink broadcast traffic so as to conserve power and operational resources.

The mobile terminal typically spends a large majority of its time in the idle and sleep modes and the power consumption during a standby mode including the idle and sleep modes has a major impact on efficient power management for the overall standby and active modes. That is, power conservation in the standby mode is an important issue for efficient power management.

Since most WiBro terminals are mobile terminals, high power consumption in the standby mode reduces the standby and communication time, resulting in reduction of user satisfaction.

FIG. 1 is a message flow diagram illustrating an operation of a conventional mobile terminal in a standby mode.

Referring to FIG. 1, if a modem 120 of the mobile phone receives a Deregistration Request message (Dreg_Req) from a host 110 of a mobile phone in step S101, the modem 120 transmits the Deregistration Request message (Dreg_Req) to a base station 130 in step S103. Upon receiving the Deregistration Request message (Dreg_Req), the base station 130 transmits a Deregistration Confirmation message (Dreg_Cmd) to the mobile phone in response to the Deregistration Request message (Dreg_Req) in step S105.

Upon receiving the Deregistration Confirmation message (Dreg_Cmd), in step S107 the modem 120 transmits a Deregistration ACKnowledgement message (Dreg_ACK) to the host 110.

If the Deregistration ACKnowledgement message (Dreg_ACK) is received, the host 110 transmits a channel state request message (Air_State_Req) to the modem 120 in step S109.

In response to the channel state request message (Air_State_Req), the modem 120 collects channel state information in step S111 and then transmits a channel state response message (Air_State_Resp) containing the collected channel state information to the host 110 in step S113. The mobile terminal checks the channel state by repeating the steps S109 to S113 in the standby mode.

As described above, the host 110 and the modem 120 of the mobile terminal are turned on in the standby mode, resulting in power consumption.

Particularly, the WiBro mobile terminal operates in different modes according to settings configured by a user or by the mobile terminal itself in a service zone. The WiBro mobile terminal checks a WiBro service availability and types of services in a current location by monitoring the channel state in the standby mode. The WiBro mobile terminal can be implemented with another network modem chip in addition to a WiBro modem chip for supporting various network services. Since most WiBro terminals are battery-powered mobile terminals, low standby power consumption is a significant factor for determining the performance of a mobile terminal.

However, since the conventional WiBro mobile terminal must maintain channel synchronization, power consumption for obtaining the channel state is required even in the standby mode. Accordingly, there can be room for further saving the power in the standby mode.

SUMMARY OF THE INVENTION

The present invention has been made in an effort to solve the above problems, and it is an aspect of the present invention to provide a power saving method of a mobile terminal that is capable of reducing power consumption in a standby mode.

It is another aspect of the present invention to provide a power saving method of a mobile terminal that is capable of reducing power consumption in a standby mode by turning off physical layer elements except when periodic channel state collection times.

It is still another aspect of the present invention to provide a power saving method of a mobile terminal that is capable of reducing power consumption in a standby mode by turning off the terminal's power after channel synchronization until an event occurs.

It is yet still another aspect of the present invention to provide a power saving method of a mobile terminal that is capable of reducing power consumption in a standby mode by controlling standby-to-active mode transition at one of a host and modem.

In accordance with an aspect of the present invention, there is provided a power saving method for a mobile terminal having a modem for communicating with a base station and a host for controlling the modem. The power saving method includes starting, at the mobile terminal, a timer if a resource withdrawal is determined through a negotiation with the base station; turning off a power of the modem; determining whether the timer has expired; and turning on the power of the modem.

Preferably, the timer is managed by the host or by the modem.

Preferably, the power saving method further includes transmitting a deregistration request message to the base station for withdrawing the resources; receiving a deregistration confirmation message in response to the deregistration request message; and determining the resource withdrawal if the deregistration confirmation message is received.

In accordance with another aspect of the present invention, there is provided a power saving method for a mobile terminal having a modem for communicating with a base station and a host for controlling the modem. The power saving method includes transmitting a standby request message from the host to the modem if a resource withdrawal is determined; turning off, at the modem, power to the modem and transmitting a standby response message to the host upon receiving the standby request message; starting, at the host, a timer upon receiving the standby response message; transmitting a synchronization request message to the modem if the timer expires; and turning on, at the modem, the power to the modem upon receiving the synchronization request message.

Preferably, the power saving method further includes performing, at the modem, synchronization with the base station after turning on the power; measuring a Received Signal Strength Indicator and Carrier-to-Interference and Noise Ratio; and transmitting the Received Signal Strength Indicator and Carrier-to-Interference and Noise Ratio to the host.

Preferably, the power saving method further includes transmitting, at the mobile terminal, a deregistration request message to the base station for withdrawing the resources; receiving a deregistration confirmation message in response to the deregistration request message; and determining the resource withdrawal if the deregistration confirmation message is received.

In accordance with yet another aspect of the present invention, there is provided a power saving method for a mobile terminal having a modem for communicating with a base station and a host for controlling the modem. The power saving method includes transmitting, at the host, a standby request message to the modem if a resource withdrawal is determined; turning off, at the modem, power to the modem, upon receiving the standby request message, transmitting a standby response message to the host, and starting a timer; turning on, at the modem, the power to the modem if the timer expires; collecting channel state information; and transmitting the collected channel state information to the host.

Preferably, the standby request message includes a channel state report time interval.

Preferably, the channel state information includes a Received Signal Strength Indicator and Carrier-to-Interference and Noise Ratio.

Preferably, the timer is set on the basis of the channel state report time interval.

Preferably, the power saving method further includes transmitting a deregistration request message to the base station for withdrawing the resources; receiving a deregistration confirmation message in response to the deregistration request message; and determining the resource withdrawal if the deregistration confirmation message is received.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The standby mode power saving method of the present invention is described in association with a mobile terminal equipped with a WiBro modem as an example. However, the present invention is not limited to the WiBro mobile terminal, but, can be adapted to mobile devices such as a digital broadcasting receiver, Personal Digital Assistant (PDA), Smartphone, International Mobile Telecommunication 2000 (IMT-2000) terminal, Code Division Multiple Access (CDMA) terminal, Global System for Mobile communication (GSM) terminal, Universal Mobile Telecommunications System (UMTS) terminal, and Wireless Local Area Network (WLAN) terminal, powered by battery.

The power saving method of the present invention enables a mobile terminal to conserve battery power by blocking power supply to physical elements in a standby mode except when periodic times at which the mobile terminal should wake up for collecting channel states. That is, the mobile terminal shuts down the power right after obtaining the synchronization with the base station until a wakeup event occurs in the standby mode, thereby reducing power consumption. Thus, the host or the modem performs the state transition from the standby mode to the active mode.

Figure 1:
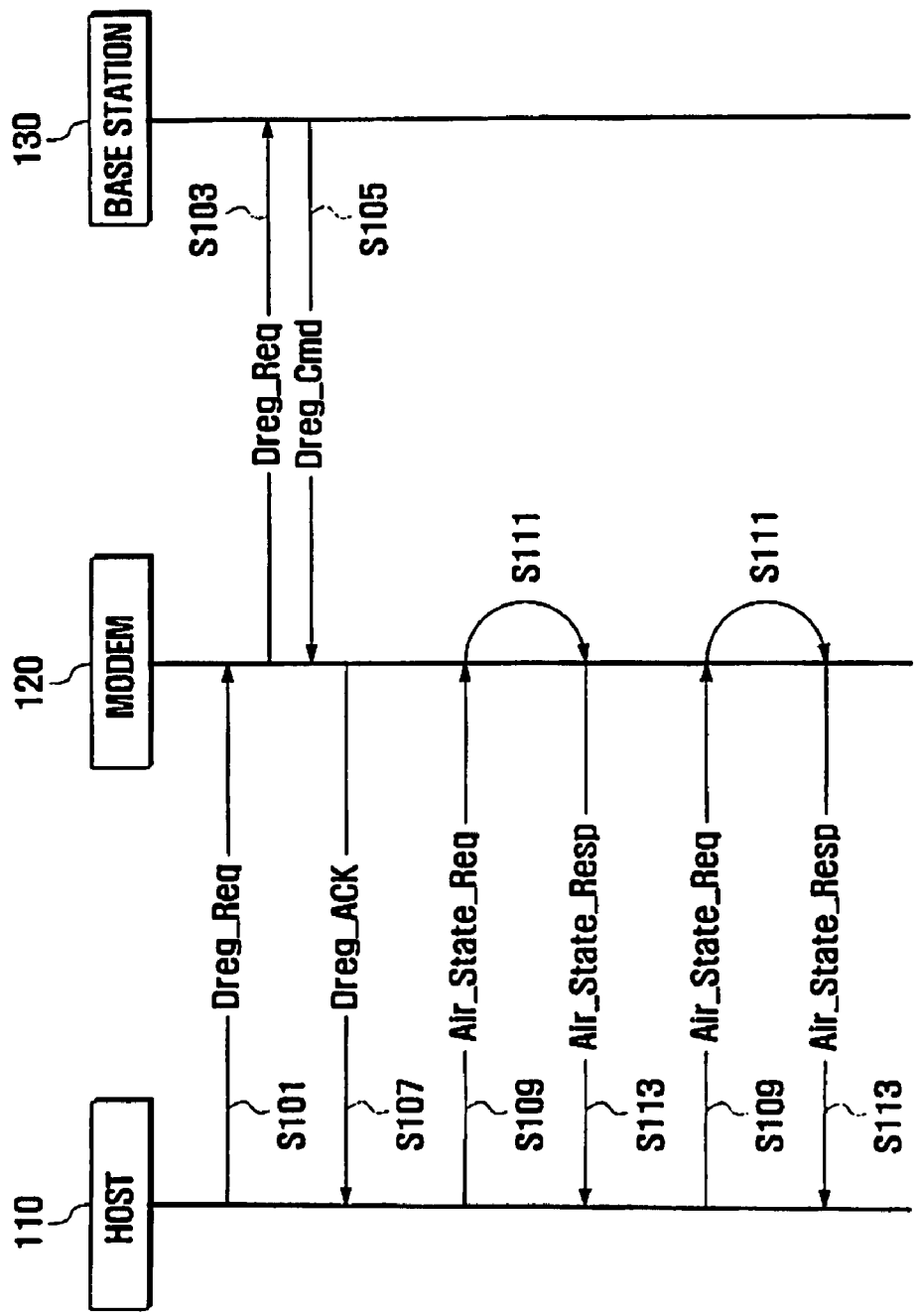
FIG. 1 is a message flow diagram illustrating an operation of a conventional mobile terminal in a standby mode.
Figure 2:
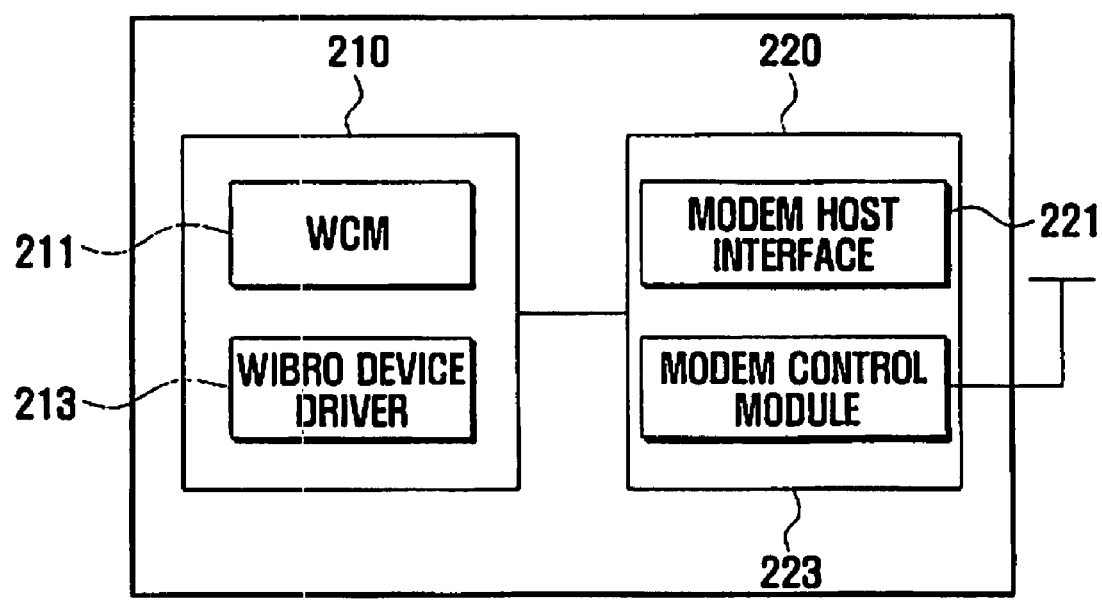
FIG. 2 is a block diagram illustrating a configuration of a mobile terminal employing a power saving method according to an embodiment of the present invention.

FIG. 2 is a block diagram illustrating a configuration of a mobile terminal employing a power saving method according to an aspect of the present invention. In this aspect of the present invention, the mobile terminal is provided with a WiBro module.

Referring to FIG. 2, the mobile terminal 200 includes a host 210 and a modem 220. The host 210 includes a WiBro Connection Manager (WCM) 211 and a WiBro device driver 213, and the modem 220 includes a modem host interface 221 and a modem control module 223.

The WCM 211 is a host application, and the WiBro device driver 213 is embodied in software for transferring a control packet generated by the WCM 211 to the modem 220.

The modem host interface 221 analyzes the control packet received from the WiBro device driver 213 and forwards transmission data and control signals obtained by the analysis result to the modem control module 223. The modem control module 223 performs an internal control in accordance with the control signal or transmits the transmission data to the base station.

If a service release request is input by a user while receiving WiBro service, the WCM 211 generates a Deregistration Request (Dreg-Req) message. The Dreg-Req message is transmitted to the base station through the WiBro device driver 213, modem host interface 221, and modem control module 223. If a Deregistration Confirmation (Dreg-Cmd) is received in response to the Dreg-Req message, the mobile terminal enters the standby mode.

In the standby mode, the conventional mobile terminal maintains operations of the WCM 211 and modem 220 for obtaining channel state information, and the operations of the WCM 211 and modem 220 in standby mode consume power. Such standby mode power consumption continues until the mobile phone operation is terminated with the WiBro system.

In this embodiment, the mobile terminal blocks the power supply to the physical layer elements except at periodic time points at which the mobile terminal collects the channel states in the standby mode.

Figure 3:
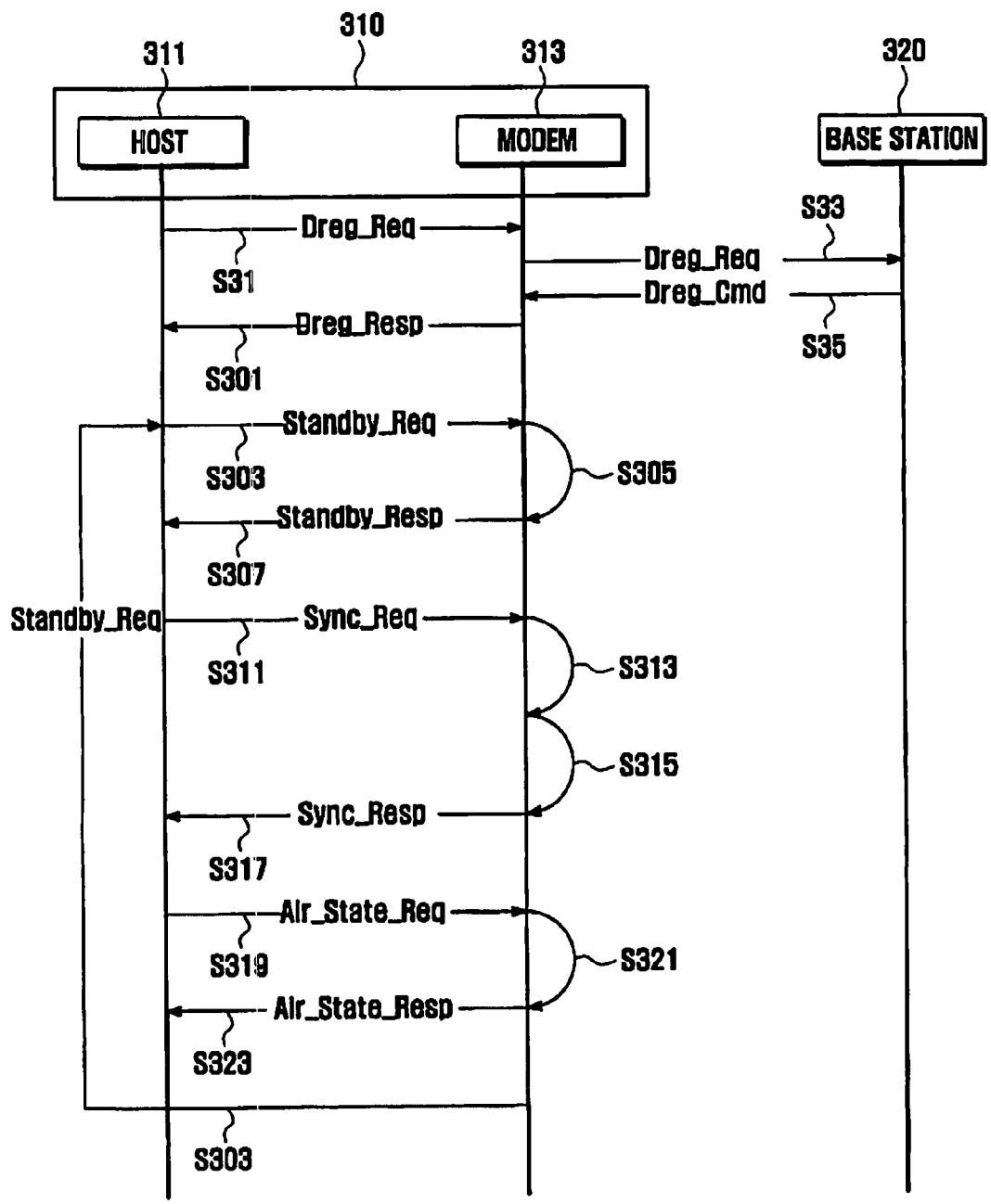
FIG. 3 is a message flow diagram illustrating an operation of a mobile terminal in a standby mode of power saving method according to a first embodiment of the present invention.

FIG. 3 is a message flow diagram illustrating an operation of a mobile terminal in a standby mode of a power saving method according to an embodiment of the present invention. In this embodiment, a host 311 of the mobile terminal 310 performs the standby mode power management.

The standby mode power saving method according to this is performed upon a modem 313 of the mobile terminal 310 receiving a Deregistration Confirmation (Dreg_Cmd) message from a base station 320 in step S35 in response to a Deregistration Request (Dreg_Req) message sent by the host 311 to the modem 313 in step S31 and forwarded therefrom to the base station 320 in step S33.

Referring to FIG. 3, when the Dreg_Cmd message is received from the base station 320, the modem 313 of the mobile terminal 310 outputs a Deregistration Response (Dreg_Resp) message to the host 311 in step S301.

Upon receiving the Dreg_Resp message from the modem 313, the host 311 generates a Standby Request (Standby_Req) message and transfers it to the modem 313 in step S303. The Standby_Req message is a request message for the modem 313 to enter the standby mode.

The modem 313 then determines whether to enter the standby mode. If the modem 313 determines that the standby mode entry is possible, the modem 313 shuts off the power to physical layer elements in step S305 and transmits a Standby Response (Standby_Resp) message to the host 311 in step S307.

Then in step S309, the host 311 starts a timer and waits for the timer to expire. When the timer expires, the host 311 generates a Synchronization Request (Sync_Req) message and transfers the Sync_Req message to the modem 313 in step S311.

In step S313, upon receiving the Sync_Req message, the modem 313 performs synchronization with the base station and collects information on a Received Signal Strength Indicator (RSSI) and Carrier-to-Interference and Noise Ratio (CINR) in step S315.

If the synchronization is successfully performed and the RSSI and CINR are collected, the modem 313 outputs a Synchronization Response (Sync_Resp) message containing the CINR to the host 311 in step S317. The RSSI and CINR can be collected after the synchronization is successfully performed. If synchronization failed in a predetermined time, the modem 313 determines that the mobile terminal 310 is out of the WiBro service area and enters an out of service mode.

If the Sync-Resp message is received, the host 311 outputs a Channel State Request (Air_State_Req) message to the modem 313 in step S319. In step S321, the modem 313 collects channel states and in step S323 transfers a Channel State Response (Air_State_Resp) containing the channel states to the host 311.

Upon receiving the Air_State_Resp message, the host 311 transmits a Standby Request (Standby_Req) message to the modem 313 such that the modem 313 enters the standby mode in step S303. That is, the host 311 checks the state of the modem 313 and requests the channel state information, if the modem 313 is in a normal state. According to the channel state information received from the modem 313 at step S323, the host 311 may enable the modem to enter the standby mode. For the process of entering the standby mode and steps thereafter, the steps S303 to S323 are repeated.

As described above, in this embodiment of the present invention, the host starts the timer upon receiving the standby mode response messages from the modem and requests to collect the channel state information when the timer expires. Before the timer expires, the modem and other physical layer elements are turned off so as to conserve the power in the standby mode.

Figure 4:
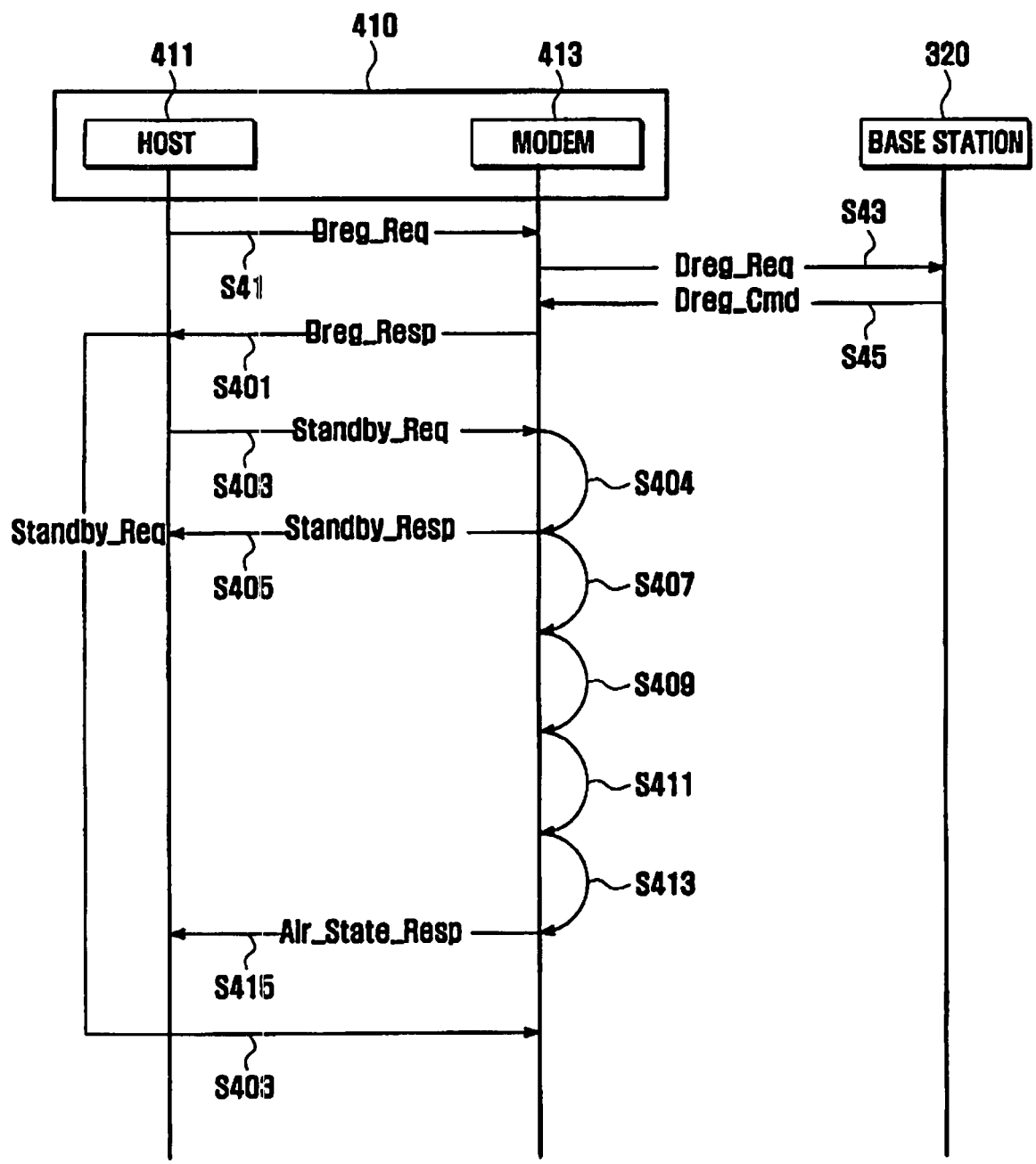
FIG. 4 is a message flow diagram illustrating an operation of a mobile terminal in a standby mode of a power saving method according to a second embodiment of the present invention.

FIG. 4 is a message flow diagram illustrating an operation of a mobile terminal in a standby mode of a power saving method according to a second embodiment of the present invention. In this embodiment, the standby mode power management is performed by a modem 413 of a mobile terminal 410.

The standby mode power saving method is performed upon the modem 413 of the mobile terminal 410 receiving a Deregistration Confirmation (Dreg_Cmd) message from the base station 420 in response to a Deregistration Request (Dreg_Req) sent by a host 411 to the modem 413 in step S41 and forwarded therefrom to the base station 420 in step S43.

Referring to FIG. 4, when the Dreg_Cmd message is received from the base station 420, the modem 413 of the mobile terminal 410 outputs a Deregistration Response (Dreg_Resp) message to the host 411 of the mobile terminal 410 in step S401.

Upon receiving the Dreg_Resp message from the modem 413, the host 411 transfers a Standby Request (Standby_Req) message to the modem 413 in step S403. The Standby_Req message contains information on a channel state report time interval such that the modem 413 sleeps and wakes up on the basis of the channel state report time interval. That is, the modem 413 determines whether to enter the standby mode, and turns off the power if it is determined that the standby mode entry is possible in step S404.

At the same time, in step S405 the modem transmits a Standby Response (Standby_Resp) message to the host 411 in response to the Standby_Req message, and also starts a timer set on the basis of the channel state report time interval in step S407. While the timer operates, the modem 413 minimizes the power consumed in the physical layer elements.

In step S409, the modem 413 determines whether the timer has expired and performs synchronization with the base station in step S411 when the timer expires. Next, if the synchronization is successfully performed, in step S413 the modem 413 collects the RSSI and CINR and transmits a Channel State Response (Air_State_Resp) message containing the RSSI and CINR to the host 411 in step S415. If the synchronization fails within a predetermined time duration, the modem 413 determines that the mobile terminal 410 is out of the WiBro service area and enters an out of service mode.

Upon receiving the Air_State_Resp message, the host 411 transmits a Standby_Request so as to repeat the steps S403 to S415.

As described above, in this embodiment of the present invention, the modem starts the timer on the basis of the channel state report, the interval contained in the Standby Request message received from the host and wakes up only when the timer expires for collecting the channel state information in the standby mode, thereby efficiently managing the power consumption in the standby mode.

As described above, the power saving method for a mobile terminal enables physical layer elements including a modem to sleep for most standby mode duration and only wake up at preset times for collecting channel state information, resulting in reduction of power consumption in the standby mode.

Although exemplary embodiments of the present invention have been described in detail herein-above, it should be clearly understood that many variations and/or modifications of the basic inventive concepts herein taught which may appear to those skilled in the present art will still fall within the spirit and scope of the present invention, as defined in the appended claims.

What is claimed is:

1. A power saving method for a mobile terminal having a modem for communicating with a base station and a host for controlling the modem, the power saving method comprising:
   determining whether a resource withdrawal is successfully negotiated;
   starting, at the mobile terminal, a timer if the resource withdrawal is determined through negotiation with the base station;
   turning off power to the modem;
   determining whether the timer has expired; and
   turning on power to the modem if the timer has expired,
   wherein the timer is set based on a channel state report time interval included in a standby request message transmitted at the host when the resource withdrawal is determined.

2. The power saving method of claim 1, wherein the host manages the timer.

3. The power saving method of claim 1, wherein the modem manages the timer.

4. The power saving method of claim 1, wherein determining whether a resource withdrawal is successfully negotiated comprises:
   transmitting a deregistration request message to the base station for withdrawing the resources;
   receiving a deregistration confirmation message in response to the deregistration request message; and
   confirming the resource withdrawal, if the deregistration confirmation message is received.

5. A power saving method for a mobile terminal having a modem for communicating with a base station and a host for controlling the modem, the power saving method comprising:
   transmitting a standby request message from the host to the modem, if a resource withdrawal is determined;
   turning off, at the modem, power to the modem and transmitting a standby response message to the host upon receiving the standby request message;
   starting, at the host, a timer upon receiving the standby response message;
   transmitting a synchronization request message to the modem, if the timer has expired; and
   turning on, at the modem, the power to the modem upon receiving the synchronization request message.

6. The power saving method of claim 5, further comprising:
   performing, at the modem, synchronization with the base station after turning on the power;
   measuring a Received Signal Strength Indicator and Carrier-to-Interference and Noise Ratio; and
   transmitting the Received Signal Strength Indicator and Carrier-to-Interference and Noise Ratio to the host.

7. The power saving method of claim 5, further comprising:
   transmitting, at the mobile terminal, a deregistration request message to the base station for withdrawing the resource;
   receiving a deregistration confirmation message in response to the deregistration request message; and
   determining the resource withdrawal, if the deregistration confirmation message is received.

8. A power saving method for a mobile terminal having a modem for communicating with a base station and a host for controlling the modem, the power saving method comprising:
   transmitting, at the host, a standby request message to the modem if a resource withdrawal is determined;
   turning off, at the modem, power to the modem, upon receiving the standby request message, and transmitting a standby response message to the host for starting a timer;
   turning on, at the modem, power to the modem when the timer has expired;
   collecting channel state information; and
   transmitting the collected channel state information to the host.

9. The power saving method of claim 8, wherein the standby request message comprises a channel state report time interval.

10. The power saving method of claim 9, wherein the channel state information comprises a Received Signal Strength Indicator and Carrier-to-Interference and Noise Ratio.

11. The power saving method of claim 9, wherein the timer is set on the basis of the channel state report time interval.

12. The power saving method of claim 8, further comprising:
    transmitting a deregistration request message to the base station for withdrawing the resource;
    receiving a deregistration confirmation message in response to the deregistration request message; and
    determining the resource withdrawal if the deregistration confirmation message is received.

* * * * *